United States Patent  [15] 3,670,044
Drehman et al.  [45] June 13, 1972

[54] CATALYTIC DEHYDROGENATION PROCESS

[72] Inventors: Lewis E. Drehman; Darrell W. Walker, both of Bartlesville, Okla.

[73] Assignee: Phillips Petroleum Company

[22] Filed: July 18, 1969

[21] Appl. No.: 843,239

[52] U.S. Cl. ..........................260/683.3, 208/138, 252/441, 252/460, 252/466, 252/472, 260/666 A, 260/668 D, 260/669 R, 260/673.5, 260/680 E, 260/696
[51] Int. Cl. .........................................B01j 11/12, C07c 5/18
[58] Field of Search................260/683.3, 680, 673.5, 668 D, 260/669 R; 208/138

[56] References Cited

UNITED STATES PATENTS

| | | | |
|---|---|---|---|
| 2,861,959 | 11/1958 | Thorn et al. | 252/465 |
| 2,906,700 | 9/1959 | Stine et al. | 208/138 |
| 3,168,587 | 2/1965 | Michaels et al. | 260/638.3 |
| 3,461,183 | 8/1969 | Hepp et al. | 260/680 |
| 3,539,651 | 11/1970 | Hepp et al. | 260/680 |
| 3,360,586 | 12/1967 | Bloch et al. | 260/683.3 |
| 3,470,262 | 9/1969 | Michaels et al. | 260/680 |
| 3,126,426 | 3/1964 | Turnquest et al. | 260/683.3 |
| 3,461,177 | 8/1969 | Box et al. | 260/673.5 |
| 3,470,262 | 9/1969 | Michaels et al. | 260/680 |
| 3,502,739 | 3/1970 | Begley et al. | 260/680 |
| 3,530,194 | 9/1970 | Quik et al. | 260/672 |
| 3,531,543 | 9/1970 | Clippinger et al. | 260/683.3 |
| 3,308,181 | 3/1967 | Pitzer | 260/680 |

Primary Examiner—Delbert E. Gantz
Assistant Examiner—G. E. Schmitkons
Attorney—Young and Quigg

[57] ABSTRACT

Cycloalkanes, arylalkanes, and alkanes, such as n-butane, when diluted with steam are dehydrogenated in the presence of gaseous hydrogen or mixtures of gaseous hydrogen and gaseous oxygen to less saturated compounds with a catalyst composition comprising a Group VIII metal or a mixture of a Group VIII metal and a Group IVa metal deposited on a support, such as a Group II aluminate spinel.

11 Claims, No Drawings

CATALYTIC DEHYDROGENATION PROCESS

The invention relates to an improved process for the dehydrogenation of dehydrogenatable hydrocarbons by conducting the dehydrogenation process in the presence of gaseous hydrogen or mixtures of gaseous hydrogen and gaseous oxygen.

It is conventional in the dehydrogenation of hydrocarbons to utilize catalysts such as platinum, nickel-kieselguhr, chromium oxide-alumina, zinc oxide-alumina, platinum-alumina, and the like. Additionally, a platinum catalyst on a support, with or without oxygen present, is known to be one possible system for the dehydrogenation of paraffin hydrocarbons in the presence of steam. More specifically, the catalytic effect of many Group VIII metals is known when deposited on a support of alumina, silica, Group II aluminate spinel and the like.

We have now discovered that a process for the dehydrogenation of alkanes, cycloalkanes and arylalkanes over a catalyst composition comprising a Group VIII metal, such as platinum, or a mixture of a Group VIII metal and a Group IVa metal, such as tin, deposited on a support selected from the group consisting of alumina, HF-treated alumina, silica, zinc oxide, magnesia, zirconia, aluminum silicate, and Group II aluminate spinels and mixtures thereof, can be materially improved when the dehydrogenation is conducted in the presence of gaseous hydrogen or mixtures of gaseous hydrogen and gaseous oxygen. In the above process, the Group II aluminate spinels are particularly effective and specifically excellent results are obtained when zinc aluminate spinel is used in conjunction with platinum and tin.

The groups of metals referred to herein are as classified in the Periodic Table published in the Chemical Rubber Company's "Handbook of Chemistry and Physics", 45th Edition (1964), page B-2.

Aluminate spinels, as referred to herein, are compounds of the formula $M(AlO_2)_2$ or $MO \cdot Al_2O_3$ wherein M is a Group IIa or IIb metal with a valence of 2 such as Zn, Mg, Fe, Be, Ca, and the like.

The quantity of gaseous hydrogen that can be used alone or in admixture with gaseous oxygen can comprise any amount that is operable according to the present invention. Specifically, from about 5–100 moles of gaseous hydrogen per 100 moles of dehydrogenatable compound can be used while in another embodiment from about 7–50 moles of gaseous hydrogen per 100 moles of dehydrogenatable compound can be used.

The quantity of gaseous oxygen that can be used when admixed with gaseous hydrogen can vary over any range that is operable with this invention. In one embodiment from about 1–30 moles of oxygen per 100 moles of dehydrogenatable compound can be used and in another embodiment from about 2–15 moles of oxygen per 100 moles of dehydrogenatable compound can be used.

The supports of this invention can be prepared by calcining for a sufficient time and at a sufficient temperature an alumina, HF-treated alumina, silica, zinc oxide, magnesia, zirconia, aluminum silicate, or Group II aluminate spinels and mixtures thereof. The spinels of this invention can be prepared by any known method and in one embodiment can be prepared by the method described by E. O. Box and David A. Uhrick in U.S. application Ser No. 828,777 filed May 28, 1969, titled HIGHLY CALCINED SUPPORT FOR CATALYTIC DEHYDROGENATION, which is hereby incorporated by reference. In another embodiment, the spinels can be formed by combining particulate ZnO and particulate $Al_2O_3$ in accordance with the method described by Darrell W. Walker in U.S. application Ser. No. 828,772, filed May 28, 1969, titled HIGH STRENGTH CATALYST PELLETS, which is hereby incorporated by reference. It is preferred that the proportions of these ingredients be approximately stoichiometric or, alternatively, that the Group II metal compound be up to 10 percent or more in excess of stoichiometric.

One catalyst composition of this invention can be prepared by combining with the support, in any manner known to the art, certain Group VIII metals, or metal compounds capable of reduction to the metal, including nickel, platinum, ruthenium, palladium, iridium, rhodium, osmium, and mixtures thereof. Platinum, which is very effective, is preferred. The Group VIII metal content of the catalyst can be in the range of about 0.01–10 weight percent of the support and, in one embodiment, is in the range of 0.1–1 weight percent of the support, and in one further embodiment, is in the range of 0.1–0.5 weight percent of the support. Throughout this application the term "weight percent of the support" means parts by weight per 100 parts by weight of support.

Any Group VIII metal compound that produces the desired results can be used. In the discussion of the compounds that can be used the platinum compounds will be used in nonlimiting examples. It is to be understood that similar compounds of the other Group VIII metals can be used. Examples of simple or noncoordination compounds that can be used are platinic chloride, chloroplatinic acid, ammonium chloroplatinate, and the like. Nonlimiting examples of coordination platinum compounds that can be used are: platinum aminoacetate, platinum dimethyl dioxime, tetraamineplatinum hydroxide, platinum diamine dinitrate, platinum tetraamine dihydroxide, platinum diamine dihydroxide, platinum hexamine dihydroxide, platinum hexamine tetrahydroxide, platinum diamine tetrahydroxide, platinum diamine dihydroxide dinitrate, platinum diamine tetranitrate, platinum diamine dinitrite, platinum tetraamine dicarbonate, platinum diamine oxalate, and the like. Additionally, many complex or coordination divalent and tetravalent platinum compounds are known and can be used.

When added to the support by impregnation from solution, some of the compounds can be added from aqueous solution, but others will require non-aqueous solvents such as alcohols, hydrocarbons, ethers, ketones, and the like.

Another composition of this invention is prepared by combining a Group IVa metal such as lead, tin and germanium with the components of the above catalyst composition. The Group IVa metal can exist in the range of about 0.01–10 weight percent of said support, and in one embodiment, can exist in the range of about 0.1–1 weight percent of said support, and in one further embodiment, can exist in the range of about 0.1–0.5 weight percent of said support. Although any Group IVa metal, when in compound form, is fully within the scope of this invention, some convenient compounds are the halides, nitrates, oxalates, acetates, carbonates, propionates, tartrates, bromates, chlorates, oxides, hydroxides, and the like of tin, germanium and lead. Tin, itself, is the preferred Group IVa metal and impregnation of the supports with tin compounds such as the stannous halides is particularly effective and convenient.

Generally speaking, the Group VIII and Group IVa compounds, which can be combined with the supports to form the catalysts used in the present invention, can be any compound in which all elements, other than those of Group VIII, or Group IVa, are volatilized during calcination. These compounds can be sequentially combined with the support, in any order, or for convenience, can be applied simultaneously in a single impregnation operation. After impregnation, the composite solids are dried and calcined.

The catalyst process of this invention is operated at temperatures between 950° and 1,150° F., preferably between 1,000° to 1,100° F., and at total pressures in the range of 0 to 200 psig, preferably 0 to 100 psig. Steam to hydrocarbon mole ratios of 0.5:1 to 30:1, preferably 2.5:1 to 15:1, are employed. Total space velocity (GHSV) of hydrocarbon and steam is between 100 and 50,000, preferably between 500 and 20,000 volumes of gas/volume of catalyst/hour (32° F., 15 psi absolute pressure).

The catalysts of the invention are particularly well adapted to the dehydrogenation of alkanes, cycloalkanes, and arylalkanes containing from two to 12 carbon atoms. These hydrocarbons include ethane, propane, n-butane, isobutane, isopentane, heptane, hexanes, octanes, dodecanes, cyclohexane, cyclododecane, cyclopentane, ethylbenzene, n-butylbenzene, and the like, and mixtures thereof. In one embodiment of the invention, n-butane is dehydrogenated to an olefin and diolefin-containing product.

During the dehydrogenation operation, the catalyst, which can be in any suitable form such as granules, pills, pellets, spheres, and the like, will slowly lose some activity and will periodically require regeneration by conventional means. This can be conveniently accomplished by cutting off the feed and treating the catalyst with steam-diluted air, such that the oxygen content of the mixture is about 1-2 mole percent. The regeneration treatment can be carried out at temperatures and pressures within the dehydrogenation operating range for about 15 minutes to 1 hour.

EXAMPLE I

A zinc aluminate spinel support was prepared by taking 0.52 mole of particulate ZnO with an average particle diameter of about 300 microns and admixing in a dry manner with 0.50 mole of flame-hydrolyzed $Al_2O_3$ wherein the particle diameter was about 0.03 micron. The dry admixture was wet with 100 ml of deionized water, dried, pelleted into ⅛-inch pellets, and calcined overnight at 1,000° C. The pellets were then impregnated with sufficient aqueous solution of stannous chloride and chloroplatinic acid to result in the impregnated pellet containing, based on the weight of the impregnated pellet, the indicated percentages of platinum and tin. The pellets were dried and used in a catalytic dehydrogenation process in a laboratory reactor.

In two control runs at different pressures impregnated catalyst pellets made as indicated above were used and the dehydrogenation process was conducted in the presence of gaseous oxygen (in air) alone and no hydrogen was present individually or in admixture with oxygen. Data pertinent to these runs are presented below as Runs 1 and 2.

| Run No. | 1 | 2 |
| --- | --- | --- |
| % Pt | .38 | .28 |
| % Sn | .23 | .17 |
| Temperature, °F. | 1025 | 1044 |
| Pressure, psig | 0 | 100 |
| Feed (GHSV) | | |
| n-Butane | 600 | 1115 |
| Air | 300 | 175 |
| Steam | 2435 | 9750 |
| % Conversion of n-butane | 37 | 36 |
| % Selectivity | | |
| Olefine & Diolefin ($C_4$) | 82 | 92 |
| Saturates & Unsaturates ($C_1$–$C_3$) | 8 | 6 |
| $CO_2$ | 10 | 2 |

Thus, applicants have demonstrated that when only oxygen is used in the described catalytic dehydrogenation the conversion and selectivity are generally low.

EXAMPLE II

In two runs at different pressures impregnated catalyst pellets made as indicated in Example I were used and the dehydrogenation process of the invention was conducted in the presence of gaseous hydrogen. Data pertinent to these runs are presented below as Runs 3 and 4.

| Run No. | 3 | 4 |
| --- | --- | --- |
| % Pt | .38 | .28 |
| % Sn | .23 | .17 |
| Temperature, °F. | 1025 | 1042 |
| Pressure, psig | 0 | 100 |
| Feed (GHSV) | | |
| n-Butane | 600 | 1255 |
| Hydrogen | 150 | 350 |
| Steam | 2850 | 10,000 |
| % Conversion of n-butane | 43 | 34 |
| % Selectivity | | |
| Olefin & Diolefin ($C_4$) | 97 | 96 |
| Saturates & Unsaturates ($C_1$–$C_3$) | 2 | 3 |
| $CO_2$ | 1 | 1 |

These data illustrate that when the dehydrogenation process is conducted in the presence of gaseous hydrogen alone superior selectivity is achieved over Runs 1 and 2 where gaseous oxygen was used.

EXAMPLE III

Two additional runs were conducted in the same general manner as Runs 3 and 4 of Example II except that the process was conducted in the presence of both gaseous hydrogen and oxygen. Data on these runs are given below as Runs 5 and 6.

| Run No. | 5 | 6 |
| --- | --- | --- |
| % Pt | .38 | .28 |
| % Sn | .23 | .17 |
| Temperature, °F. | 1025 | 1045 |
| Pressure, psig | 0 | 100 |
| Feed (GHSV) | | |
| n-Butane | 600 | 1210 |
| Air | 300 | 195 |
| Hydrogen | 150 | 120 |
| Steam | 2850 | 9870 |
| % Conversion of n-butane | 49 | 39 |
| % Selectivity | | |
| Olefin & Diolefin ($C_4$) | 95 | 96 |
| Saturates & Unsaturates ($C_1$–$C_3$) | 4 | 3 |
| $CO_2$ | 1 | 1 |

These data illustrate that when the dehydrogenation process is conducted in the presence of both gaseous hydrogen and oxygen that conversion percentages are generally superior to those in Runs 1 and 2 where oxygen only was used, or Runs 3 and 4 where only hydrogen was used. Also, it is to be noted that the percentage selectivity to olefin and diolefin is greatly improved over Runs 1 and 2 where only oxygen was used.

Various modifications can be made in view of the disclosure and claims of this application without departing from the spirit or scope thereof.

What is claimed is:

1. A process for dehydrogenating dehydrogenatable hydrocarbons selected from the group consisting of alkanes, cycloalkanes, and arylalkanes which comprises contacting under dehydrogenating conditions in the presence of steam a feed mixture comprising said inlet hydrocarbons, gaseous hydrogen, and gaseous oxygen, wherein said gaseous hydrogen is present in an amount in the range of from about 5 to about 100 mols per 100 mols of inlet hydrocarbon and the amount of oxygen is in the range of from about 1 to about 30 moles per 100 mols of inlet hydrocarbon and wherein the oxygen:hydrogen molar ratio is in the range of 0.2–0.42:1, with a dehydrogenation catalyst composition comprising:
   a. a support selected from the group consisting of Group II aluminate spinels and mixtures thereof; and
   b. a metal selected from the group consisting of nickel, platinum, palladium, ruthenium, iridium, rhodium, osmium, and mixtures thereof.

2. The process of claim 1 wherein:
said metal comprises platinum and is in the range from about 0.01–10 weight percent of said support.

3. The process of claim 2 wherein:
   a. said Group II aluminate spinel comprises zinc aluminate spinel; and
   b. said platinum is in the range of about 0.1–1 weight percent of said zinc aluminate spinel.

4. The process of claim 3 wherein:
said platinum exists in the range of about 0.1–0.5 weight percent of said zinc aluminate spinel.

5. The process of claim 1 wherein said catalyst composition further comprises a metal selected from the group consisting of tin, lead and germanium.

6. The process of claim 2 wherein said catalyst composition further comprises tin and said tin is in the range from about 0.01–10 weight percent of said support.

7. The process of claim 3 wherein said catalyst composition further comprises tin and said tin is in the range of about 0.1–1 weight percent of said zinc aluminate spinel.

8. The process of claim 4 wherein said catalyst composition further comprises tin and said tin exists in the range of about 0.1–0.5 weight percent of said zinc aluminate spinel.

9. The process of claim 1 wherein:
a. said pressure of the dehydrogenation conditions is in the range from about 0–200 psig; and
b. wherein said temperature of the dehydrogenation conditions is in the range from about 950°–1,150° F.

10. The process of claim 9 wherein:
a. said pressure is in the range of 0–100 psig; and
b. wherein said temperature is in the range of 1,000°–1,100° F.

11. The process of claim 1 wherein:
a. said amount of gaseous hydrogen is in the range of about 7–50 moles per 100 moles of inlet hydrocarbon; and
b. said amount of gaseous oxygen is in the range of about 2–15 moles per 100 moles of inlet hydrocarbon.

* * * * *